UNITED STATES PATENT OFFICE 2,472,832

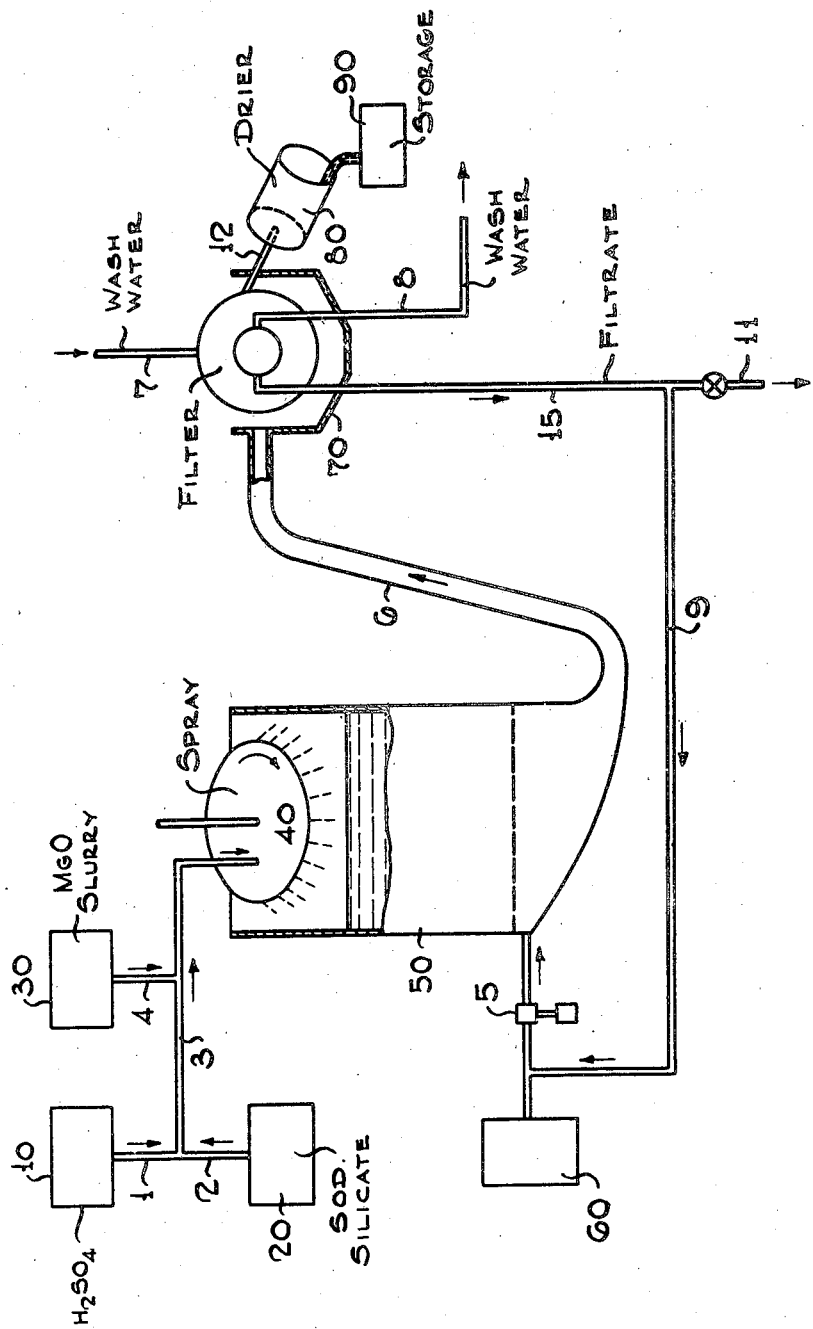

PROCESS FOR THE PREPARATION OF A SILICA-GROUP IV METAL OXIDE CATALYST

Edward A. Hunter and Charles N. Kimberlin, Jr., Baton Rouge, La., assignors to Standard Oil Development Company, a corporation of Delaware Application February 28, 1947, Serial No. 731,563

14 Claims. (Cl. 252—454)

Our invention is concerned with improved catalysts and more specifically relates to an improved process for the preparation of catalysts suitable for utilization in cracking, reforming, isomerization, polymerization and alkylation and similar processes. Our invention is particularly concerned with an improved method for the preparation of catalyst comprising silica. In accordance with our invention, catalysts comprising silica are prepared by treating a silica-magnesia hydrogel with a metal salt solution under conditions to produce a catalyst comprising silica and the oxide of the metal. In accordance with our process the salt solution is a salt solution of a metal selected from group 4 of the periodic table.

It is well known in the art to improve the quality of oils, particularly petroleum oils, by treating the same with catalyst under various operating conditions. For example, it is known to treat high-boiling petroleum oils with a catalyst comprising silica at temperatures in the range from about 600° F. to about 1100° F. in order to crack the oil and to secure petroleum oil fractions boiling in the motor fuel boiling range. Oxides of other metals, as for example, magnesium, manganese, zirconium, beryllium and aluminum are employed in conjunction with the silica. Particularly desirable catalysts suitable for treating petroleum oils boiling in the gas-oil boiling range in order to produce lower boiling fractions comprise a silica-titania catalyst, a silica-zirconia catalyst and a silica-thoria catalyst.

Heretofore these catalysts have been prepared by various procedures. One method is to prepare the silica hydrogel by mixing an alkali silicate with an acid. The alkali silicate usually comprises a sodium silicate ($Na_2O.3.25SiO_2$) solution having a specific gravity of about 1.2. This is mixed with a sulfuric acid having a specific gravity somewhere in the range of about 1.19. The hydrosol may be impregnated with a soluble salt of the desired metal or the silica hydrosol may be allowed to gel and the resulting silica hydrogel washed and soaked in a solution comprising the salt of the desired metal or metals.

One method employed for the preparation of a silica-magnesia catalyst is to prepare the hydrogel by the mixing of a silicate and sulfuric acid. The hydrogel is washed and mixed and granulated with magnesia and water. The mixture is passed through a colloid mill and homogenized. The catalyst is aged at room temperature for a period from about 24 to 72 hours. Elevated temperatures have also been employed in which cases, the aging time period is reduced to a period of from about 5 to 10 hours. The catalyst is dried at a temperature in the range from about 200° F. to 270° F. Another method utilized for the preparation of the silica-magnesia catalyst is to prepare the silica hydrogel by mixing sulfuric acid and an alkali metal silicate. The silica hydrogel is washed and impregnated with magnesium sulfate. The impregnated silica hydrogel is treated with an ammonia solution to precipitate the magnesia. This may require a time period of from about 8 to 24 hours. A preferred method of preparing a catalyst comprising silica and magnesia is to add magnesia to a silica hydrosol or to a silica hydrosol impregnated with a metal salt such as with an aluminum salt. The mixture is washed preferably at elevated temperatures. The general process comprises adding magnesia preferably as a slurry in water to a silica hydrosol which has been impregnated with a salt, as for example, with an aluminum salt. The action of magnesia is to neutralize the free acid, thus causing rapid setting of the hydrosol to the hydrogel and also to decompose the aluminum salt or other salt present causing precipitation of alumina within and throughout the gel. Excess magnesia used over these requirements remains in the finished product as magnesia. The magnesia employed to neutralize the acid and the salt of the added third metal, reacts to form magnesium salt which is removed upon washing. If it is desired to produce a gel comprising silica and magnesia, excess magnesia is added preferably as a water slurry over that required to neutralize the excess acidity thus causing the formation of a gel comprising silica and magnesia.

We have now discovered an improved process for the preparation of a catalyst gel comprising silica and a metal oxide, the metal of which is preferably selected from group 4 of the periodic table.

Our process comprises preparing a hydrogel of silica and magnesia. This is prepared by any suitable means, preferably by preparing a silica hydrosol by the mixing of a sodium silicate with an acid preferably sulfuric acid. The silica hydrosol is treated with magnesia preferably with a water slurry of magnesia through a jet spray nozzle and gelled to form a gel comprising silica and magnesia. The resulting gel is treated with a solution of a metal salt, the metal of which is selected from group 4 of the periodic table to produce a gel catalyst comprising silica and a metal oxide.

The process of our invention may be readily understood by reference to the drawing illustrating an embodiment of the same.

Referring specifically to the drawing a silica sol is prepared by withdrawing sulfuric acid from zone 10 by means of line 1 and mixing the acid with sodium silicate which is withdrawn from zone 20 by means of line 2. The mixtures pass through line 3. A water slurry of magnesia is withdrawn from zone 30 and introduced into line 3 by means of line 4. The mixture is then passed through a spray nozzle arrangement 40. Nozzle arrangement 40 may comprise a rotating or equivalent spray means. The material passing from means 40 comprises a silica-magnesia sol which sets rapidly to a silica-magnesia gel. The gel particles fall downwardly through zone 50 which preferably comprises air. It is to be understood however that zone 50 may contain oil or another water immiscible fluid.

In accordance with our invention a metal salt solution is withdrawn from zone 60 and introduced in the bottom of zone 50 by pumping or equivalent means 5. For the purpose of illustration it is assumed that the metal salt solution comprises a metal sulfate solution. In the bottom of zone 50 the magnesia of the gel is replaced by the metal oxide of the metal salt resulting in a gel comprising silica and metal oxide.

The solution is withdrawn from zone 50 by means of line 6 and passed through a separation and washing zone 70. The filtrate comprising a metal sulfate solution is withdrawn from zone 70 by means of line 15 and is preferably recycled by means of line 9. This solution however may be partially or wholly withdrawn from the system by means of line 11. The solids after removal of the filtrate comprise gel particles consisting of silica and metal oxide. The solids also comprise magnesium and sodium sulfates. The magnesium and sodium sulfates are removed by washing the solids with water which is introduced into zone 70 by means of line 7. The water containing dissolved magnesium and sodium sulfates is removed from zone 70 by means of line 8.

The washed silica gel comprising silica and metal oxide is withdrawn from zone 70 by means of line 12 and passed into a drying zone 80. Here the gel is dried or heat treated at the desired temperature for any desirable period of time. The dried or heat treated gel is withdrawn from zone 80 and passed to storage zone 90 and handled in any manner desirable.

The process in our invention comprises preparing a silica-magnesia hydrogel by any suitable process. The resulting hydrogel is then soaked in a solution of metal salt, the metal of which is preferably selected from group 4 of the periodic table.

Satisfactory salts of these metals are any salts which are characterized by the fact that the metal of the salt will form the oxide and replace magnesia in the silica-magnesia hydrogel. Satisfactory salts are, for example, the sulfates, the chlorides and the nitrates. The preferred salts comprise the chlorides. This catalyst is washed to remove the magnesium salts and also any sodium salts present. The catalyst is then dried and activated as desired.

The process may be somewhat modified, for example, the silica-magnesia hydrogel may be washed with water to remove magnesium sulfate and sodium sulfate prior to soaking the silica-magnesia hydrogel in the salt solution. Although we prefer to use room temperatures, in the soaking operation it is to be also understood that elevated temperatures and higher pressures may be employed.

By preparing the silica metal oxide hydrogel in accordance with our process, it is possible to get a hydrogel comprising a relatively high percentage of the metal oxide. It is to be understood that mixed salts such as zirconium and thorium chlorides may be utilized and double replacement secured.

The process of our invention is not to be limited by any theory as to mode of operation but only in and by the following claims in which it is desired to claim all novelty insofar as the prior art permits.

We claim:

1. Improved process for the preparation of a hydrogel comprising silica and an oxide of a metal of group 4 of the periodic table which comprises admixing a silica sol and an aqueous slurry of magnesia, converting the resulting mixture to a silica-magnesia hydrogel, contacting said hydrogel with a solution of a salt of a metal selected from group 4 of the periodic table for a sufficient period of time to permit the magnesia of the hydrogel to react with the said metal salt to form, by double decomposition, a silica-metal oxide hydrogel and a magnesium salt, and washing the silica-metal oxide hydrogel free of the magnesium salt.

2. Process as defined by claim 1 wherein said metal salt solution is a sulfate solution.

3. Improved process for the preparation of a hydrogel comprising silica and an oxide of a metal of group 4 of the periodic table which comprises spraying a mixture of a silica sol and an aqueous slurry of magnesia into a zone wherein the sprayed mixture is converted to particles of silica-magnesia hydrogel, contacting the said hydrogel particles in said zone with a solution of a salt of a metal selected from group 4 of the periodic table for a sufficient period of time to permit the magnesia of the silica-magnesia hydrogel to react with the metal salt to form a hydrogel of silica and of the oxide of the metal selected, and a magnesium salt, and washing the silica-metal oxide hydrogel free of the magnesium salt.

4. Improved process for the preparation of a hydrogel comprising silica and a metal of group 4 of the periodic table which comprises preparing a silica-magnesia hydrogel, soaking said hydrogel in a solution of a salt of a metal selected from group 4 of the periodic table, maintaining said hydrogel in contact with the metal salt solution for a sufficient period of time to cause the magnesia of the hydrogel to react with the metal salt to form a silica-metal oxide hydrogel and a magnesium salt and washing the silica-metal oxide hydrogel free of magnesium salt.

5. Improved process for the preparation of a hydrogel comprising silica and a metal of group 4 of the periodic table which comprises spraying a mixture of a silica sol and an aqueous slurry of magnesia into an initial zone wherein the sprayed mixture is converted to particles of silica-magnesia hydrogel, contacting said hydrogel particles in a portion of said zone with a solution of the salt of a metal selected from group 4 of the periodic table for a sufficient period of time to permit the magnesia of the hydrogel to react with the metal salt to form a magnesium salt and a silica-metal oxide hydrogel, withdrawing the resulting mixture of silica-metal oxide hydrogel, metal salt solution and magnesium salt from said initial zone and passing the same to a second zone, separating the solids from the mixture by filtration in said second zone, recycling the resulting filtrate to said initial zone, washing the separated solids in said second zone with water to dissolve out magnesium salt from the solids, removing the washed silica-metal oxide hydrogel from said second zone and passing said washed hydrogel to a drying zone and recovering dried hydrogel from said drying zone.

6. Process as defined by claim 3, wherein the said metal salt solution comprises a titanium salt.

7. Process as defined by claim 3 wherein the said metal salt solution comprises a zirconium salt.

8. Process as defined by claim 3 wherein the said metal salt solution comprises a thorium salt.

9. Process as defined by claim 4 wherein said metal salt solution comprises a titanium salt.

10. Process as defined by claim 4 wherein said metal salt solution comprises a zirconium salt.

11. Process as defined by claim 4 wherein said metal salt solution comprises a thorium salt.

12. Process as defined by claim 5 wherein said metal salt solution comprises a titanium salt.

13. Process as defined by claim 5 wherein said metal salt solution comprises a zirconium salt.

14. Process as defined by claim 5 wherein said metal salt solution comprises a thorium salt.

EDWARD A. HUNTER.
CHARLES N. KIMBERLIN, Jr.

REFERENCES CITED

The following references are of record in the file of this patent:

UNITED STATES PATENTS

| Number | Name | Date |
|---|---|---|
| 1,256,032 | Mittasch et al. | Feb. 12, 1918 |
| 1,925,820 | Reyerson | Sept. 5, 1933 |
| 2,283,173 | Bates | May 19, 1942 |